(12) United States Patent
Soane et al.

(10) Patent No.: US 6,416,690 B1
(45) Date of Patent: Jul. 9, 2002

(54) PRECISION COMPOSITE LENS

(75) Inventors: David S. Soane, Piedmont; Michael R. Houston, Berkeley, both of CA (US)

(73) Assignee: ZMS, LLC, Emeryville, CA (US)

( * ) Notice: Subject to any disclaimer, the term of this patent is extended or adjusted under 35 U.S.C. 154(b) by 0 days.

(21) Appl. No.: 09/505,260

(22) Filed: Feb. 16, 2000

(51) Int. Cl.⁷ .............................................. B29D 11/00
(52) U.S. Cl. ........................ 264/1.7; 264/1.36; 264/1.38
(58) Field of Search .............................. 264/1.36, 1.38, 264/1.1, 1.7; 425/808

(56) References Cited

U.S. PATENT DOCUMENTS

| | | | |
|---|---|---|---|
| 3,968,305 A | | 7/1976 | Oshima et al. ............. 428/334 |
| 4,402,887 A | | 9/1983 | Kuriyama et al. |
| 5,372,755 A | * | 12/1994 | Stoerr et al. ................. 264/1.7 |
| 5,723,541 A | | 3/1998 | Ingenito et al. ............... 525/92 |
| 5,851,328 A | * | 12/1998 | Kohan ........................ 264/1.7 |
| 5,938,876 A | * | 8/1999 | Edwards et al. |
| 6,074,579 A | * | 6/2000 | Greshes ...................... 264/1.7 |
| 6,241,922 B1 | * | 6/2001 | Bishop et al. ................ 264/1.7 |

FOREIGN PATENT DOCUMENTS

| | | |
|---|---|---|
| EP | 0 106 641 | 4/1984 |
| EP | 0 238 863 | 9/1987 |
| GB | 498 679 | 2/1939 |
| GB | 557 432 | 6/1946 |
| GB | 2 257 978 | 1/1993 |
| WO | WO 93/21010 | 10/1993 |
| WO | WO 00/17675 | 3/2000 |
| WO | WO 00/55653 | 9/2000 |

OTHER PUBLICATIONS

Search Report, Jul. 6, 2001, International Patent Appln. PCT/US01/04791, "Precision Composite Articles"; ZMS LLC, David S. Soane, et al., applicants.

* cited by examiner

*Primary Examiner*—Mathieu D. Vargot
(74) *Attorney, Agent, or Firm*—Jacqueline S. Larson

(57) ABSTRACT

The invention is directed to a method for making composite optical lenses, which includes the steps of obtaining an optical lens "core"; placing a semi-solid-like polymerizable composition in contact with at least one of the front or back surface of the core; compressing or heating the resulting semi-solid/core sandwich between two mold halves, where the mold contacting the semi-solid polymerizable material has a desired surface geometry; and exposing the semi-solid/core sandwich to a source of polymerizing energy. The resulting composite lens has the desirable characteristics of the core but is also easily fabricated with both toroidal curves and multi-focal pockets as a result of the semi-solid molding process. Also included within the present invention is a composite optical lens comprising a core portion and at least one layer of a cured resin bonded to the core portion, the cured resin comprising an interpenetrating crosslinked polymer network of reactive plasticizer within an entangled dead polymer. In one embodiment, the reactive plasticizer polymer network is further crosslinked to the dead polymer. The composite lens exhibits dimensional stability and high-fidelity replication of an internal mold cavity. The final lens may be a multi-vision lens and further may incorporate astigmatic corrections.

25 Claims, No Drawings

PRECISION COMPOSITE LENS

FIELD OF THE INVENTION

This invention is related to the fields of polymerization and molding. More particularly, it is related to a process for quickly and inexpensively producing an optical quality lens. It is also related to optimal materials of construction and to the resulting composite structure.

BACKGROUND OF THE INVENTION

Ophthalmic lenses are used to correct vision by changing the focal length of the light rays entering the pupil of an eyeglass-wearer. When the patient is near-sighted or far-sighted, the correction is rather simply made using a single vision lens in which the outer and inner surfaces of the lens are both spherical, but have different radii of curvature. An added level of complication occurs when a patient exhibits astigmatism in one or both eyes. In this case the back surface of the lens is made toroidal by imposing two different radii of curvature on the same surface. In order to properly correct for astigmatism, the rotational position of the toroidal surface must be fixed with respect to the pupil of the eyeglass-wearer (typically accomplished with the eyeglass frames). Yet another level of complication is introduced in patients who require multi-vision lenses, such as bifocals and progressives. In this case, a bifocal pocket is molded into the front surface of the lens, providing a region that corrects to one focal length while the remainder of the lens corrects to a second focal length. The most common example of this is someone who is both near-sighted (needs eyeglasses to see objects at a distance) and far-sighted (needs a bifocal pocket to read text for example).

When a patient needs both multi-vision lenses and astigmatic correction, the toroidal back surface must be fixed rotationally with respect to the location and orientation of the bifocal pocket. This presents an obstacle to high-throughput manufacturing of plastic ophthalmic lenses, for reasons which will be discussed below.

Polycarbonate is widely used as an optical material for the production of ophthalmic lenses. It has a refractive index of 1.586, reasonably good light transmission, and extremely good impact resistance. Imparting scratch resistance to polycarbonate lenses must typically be accomplished with a secondary coating.

Polycarbonate ophthalmic lenses are formed by injection molding. Injection molding is a process that requires high injection and clamping pressures. As a result, molds are quite expensive for industrial-scale equipment. In addition, changing molds from one to another is time-consuming and involves a significant amount of down-time for the injection molding system.

Typical ophthalmic lenses have a prescription range of +2 to −6 diopters in ¼ diopter increments, a bifocal pocket of 0 to +3 diopters in ½ increments, and an astigmatic correction from 0 to 2 in ¼ increments and a specified rotational angle of 0 to 90 degrees in 1-degree increments. Thus, taking into account all of the possible variations, there are roughly $10^5$ different prescriptions possible. In terms of injection molding, there would have to be approximately 150 different front molds and 720 different back molds in order to accommodate the prescription ranges covering multi-vision lenses with astigmatic correction. These numbers increase even more when other design features such as aspherical lenses or progressives are considered. The high-volume production of polycarbonate lenses with only a few variations can be quite economical. However, since molds are expensive and change-out time is excessive, injection molding of multi-vision lenses incorporating astigmatic corrections is not practical due to the large number of variations. Even if such a manufacturing process could be economically carried out, long tooling change-out times would require stocking the entire range of prescriptions, adding substantially to the cost of the lens.

Thus, polycarbonate lenses have only captured a relatively small market share compared to conventional lens manufacturing materials and processes, namely the mechanical grinding and polishing of CR-39 lens blanks. Multi-focal lenses with astigmatic corrections are produced today primarily by mechanical grinding of one or more of the surfaces, another labor-intensive, time-consuming, and expensive process.

SUMMARY OF THE INVENTION

The present invention is directed to a fabrication method whereby the beneficial properties of polycarbonate (especially the impact resistance) or other optical quality materials may be realized in multi-focal lenses, without the drawbacks of injection-molding or mechanically grinding a wide variety of lens prescriptions. The method makes use of a polycarbonate or other desirable core that is sandwiched with one or more semi-solid polymerizable materials to give a composite lens having a desired geometry and configuration. Core materials may be chosen to give good impact resistance, elasticity, photochromic behavior, etc.

More particularly, the process of the invention includes the steps of obtaining a core; placing a semi-solid-like polymerizable composition in contact with at least one of the front or back surfaces of the core; compressing and/or heating the resulting semi-solid/core sandwich between two mold halves, where the mold contacting the semi-solid polymerizable material has a desired surface geometry; and exposing the semi-solid/core sandwich to a source of polymerizing energy, to yield the finished lens, which is a composite sandwich of one or more previously semi-solid layers combined with a core. The resulting composite lens may have exceptional impact resistance when incorporating a polycarbonate core, but is also easily fabricated with both toroidal curves and multi-focal pockets as a result of the semi-solid molding process. Other beneficial properties may be included by appropriate choice of the core or semi-solid material(s).

Also included within the present invention is a composite optical lens comprising a core portion and at least one layer of a cured resin bonded to the core portion, the cured resin comprising a semi-interpenetrating crosslinked polymer network of reactive plasticizer within an entangled dead polymer. In one embodiment, the reactive plasticizer polymer network is further crosslinked to the dead polymer. The composite lens exhibits dimensional stability, high-fidelity replication of an internal mold cavity, and high impact resistance. In a presently preferred embodiment, the final lens is a multi-vision lens and further may incorporate astigmatic corrections.

DETAILED DESCRIPTION OF THE INVENTION

The terms "a" and "an" as used herein and in the appended claims mean "one or more".

The optical lens core composition of the present invention is selected to provide high impact-resistance or any other desirable property to the resulting lens. In accordance with an embodiment of the present invention, preferred polymers for use as optical lens cores are aromatic halogenated or non-halogenated polycarbonate polymers. More preferred polymers are bisphenol A polycarbonate, ortho-methoxy bisphenol A polycarbonate, $\alpha,\alpha'$-dichloro bisphenol A polycarbonate, and poly(diphenyl methane bis(4-phenyl) carbonate), with the most preferred material for use in connection with the present invention being bisphenol A polycarbonate. Bisphenol A polycarbonate is commercially available in the form of finished or semi-finished single vision lens preforms from Essilor. Bisphenol A polycarbonate has a high impact resistance, a refractive index of about 1.58 and an Abbe number of about 28–30.

Other core materials may be useful for the present invention as well. For example, optical quality or photochromic glasses, bisallyl carbonates, polyethylene terephthalates, polybutylene terephthalates, polystyrenes, polymethyl methacrylates, acrylonitrile-butadiene-styrene copolymers, polystyrene-co-butadiene copolymers, polystyrene-co-isoprene copolymers, polycyclohexylethylene-co-butadiene copolymers, amorphous polyolefins, polyurethanes, or variations thereof, and others, may be advantageously used as one or more core materials in the present invention (many optical quality glasses and plastics are known in the current art). The advantage to this approach is to combine one or more desirable properties of the core material (impact resistance in the case of polycarbonate, for example) with the benefits to be realized by molding a semi-solid material.

The cores useful in the practice of the present invention may be simple piano lenses (i.e., no correction) consisting of two spherical or aspherical surfaces. Alternatively, one surface may be spherical or aspherical, while the other surface may possess either the toroidal shape for astigmatic correction (back) or a corrective or prescription section for multi-vision correction (front). By "multi-vision" is meant herein that there is a bifocal, a multi-focal, or a progressive focal region present on the surface of the lens. Such cores are commercially available or, in the case of plastic cores, they may be easily manufactured by standard injection molding techniques well known in the art because the number of different variations for either the front or the back surfaces alone is small. The cores may alternatively have different radii of curvature comprising their front and back surfaces (i.e., non-plano surfaces). Such may be the case when the primary optical correction is to be built into the core instead of into the cured resin layer.

The semi-solid polymerizable material may be added to both the front and the back surfaces of the core, to just the front surface of a core already possessing a desired back curve, or to just the back surface of a core already possessing a desired corrective surface on the front. Alternatively, the semi-solid may be added in between two plastic cores, one having the desired front surface geometry and the other having the desired back surface geometry. The resulting semi-solid/core sandwich is then compressed between two mold halves. In one embodiment of this invention, the semi-solid material may be placed in the center of the core or mold so that when the mold(s) and/or core(s) are compressed together, the semi-solid will flow radially outward towards the core or mold edges. Such a configuration allows the semi-solid material to fill in the gap between the core and mold while reducing or eliminating the entrainment of bubbles, air pockets, or other void defects between the semi-solid and the core(s), between the semi-solid and the mold(s), or within the semi-solid itself.

The mold face(s) that contact the semi-solid material have the desired surface geometry for either the back or front surfaces, or both. When the semi-solid material is placed on both the front and back surfaces of the core, the individual molds will be selected to have the desired front and back corrective configurations. When the semi-solid material is only molded on one side of the core, the core surface not contacting the semi-solid material may simply be held with a mold blank approximately matching the curvature of the core, which will give support to the core. However, such molds need not have optically smooth surfaces. When two cores are sandwiched with the semi-solid in between, the molds should have the approximate curvature of the desired lens, but optical quality surfaces on the molds are no longer required.

The rotational configuration of the toroidal back surface is obtained by simply rotating the back mold or back core relative to the front mold (or relative to the front core surface if the multi-vision pocket is already molded into the core). Thus, back molds or cores with different degrees of rotation are not required by this ophthalmic lens fabrication method because the rotational angle is "dialed in" during the final molding process. This greatly reduces the inventory of molds or cores that must be stocked to produce a given range of prescriptions. And since the molds are only used to shape the semi-solid material, the molds are much simpler and less expensive than those required for injection molding.

Once the semi-solid/core sandwich has been pressed into the desired shape, the system is exposed to a source of polymerizing energy (such as UV light and/or temperature; x-rays; e-beam; gamma radiation; or ionic initiation) to cure the semi-solid material, which forms a cured resin portion that is bonded to the core. Upon cure, the molds are separated, yielding the finished lens, which is a composite sandwich of one or more previously semi-solid layers combined with a core. When polycarbonate cores are used, the resulting composite lens has exceptional impact resistance, but is also easily fabricated with both toroidal curves and multi-focal pockets as a result of the semi-solid molding process. Such lenses may be economically produced by "just-in-time" manufacturing techniques, thus eliminating the need to inventory a large number of lenses to cover the available prescription ranges and design style features.

The terms "semi-solid" and "semi-solid-like" as used herein and in the appended claims mean that, in essence, the polymerizable composition is a rubbery, taffy-like mass at sub-ambient, ambient, or elevated temperatures. Preferably the semi-solid mass has a sufficiently high viscosity to prevent dripping at ambient temperatures and pressures or below, but is malleable and can easily deform and conform to mold surfaces if the mold cavity is slightly heated or as a result of pressure exerted by pressing the two mold halves together, or a combination of both heat and pressure.

The advantage of this semi-solid composition is that it can be pre-formed into a slab, disk, ball, or sheet, for example, which may in turn be pressed between mold halves to define a lens or other object without an intervening gasket. Alternatively, a glob of this semi-solid composition can be applied at slightly elevated temperature on one side of a mold cavity. The core(s) and/or one or both mold halves are then brought into contact with the semi-solidified mass, which is squeezed into the final desired shape by the approaching mold halves or cores. Again, there is no need for gasketing of the assembly, as the composition will not run out of the mold due to its viscous semi-solid-like nature (except that which is squeezed out in clamping the mold shut). Furthermore, the shaped mass may be kept at a slightly elevated temperature after mold closure (without loss of the material out of the mold) to anneal away the stresses (birefringence), if any, introduced by squeezing, before the system is exposed to a source of polymerizing energy (such as UV light or temperature) to trigger network formation (curing).

The semi-solid polymerizable materials useful in the present invention comprise a mixture of a reactive plasticizer, a polymerization initiator and, optionally, a dead polymer. The compositions may optionally include other additives well-known in the art, such as mold release agents to facilitate removal of the object from the mold after curing, non-reactive conventional plasticizers or flexibilizers, pigments, dyes, tinting agents, organic or inorganic fibrous or particulate reinforcing or extending fillers, thixotropic agents, indicators, inhibitors or stabilizers (weathering or non-yellowing agents), UV absorbers, surfactants, flow aids, chain transfer agents, anti-reflective agents, scratch-resistant additives, and the like. For the practice of the invention as disclosed herein, it is only required that the composition be highly viscous, semi-solid or solid-like for handling and/or insertion into a mold assembly at some temperature, while being semi-solid or liquid-like (i.e., deformable) at the processing temperature to which the mold assembly is heated or cooled after closure. Since most known material systems become more compliant upon heating, the molding temperature will usually, but not necessarily, be equal to or higher than the handling temperature. In principle, any reactive plasticizer system (with or without dead polymer) which can be handled as a semi-solid or solid at some temperature, and which can be made to conform to a desired geometry (with or without changing the temperature and/or using force), can be used for the practice of the invention.

The semi-solid materials are prepared, in one embodiment, by mixing a dead polymer with at least one small-molecule species, which is itself polymerizable or crosslinkable. This small-molecule species is referred to herein as a "reactive plasticizer". In another embodiment, the semi-solid polymerizable material comprises a reactive plasticizer or a mixture of reactive plasticizers, without the presence of a dead polymer. The reactive plasticizer may encompass monomers, crosslinkers, oligomeric reactants, oligomeric crosslinkers, or macromeric reactants or macromeric crosslinkers (collectively macromers). The reactive plasticizers can be mixtures themselves, composed of mono-functional, bi-functional, tri-functional or other homogeneous or heterogeneous multi-functional entities (heterogeneous reactive plasticizers being those that possess two or more different types of reactive functionalities). The reactive plasticizer plasticizes the dead polymer to give a composition having the desired consistency at ambient temperature or below (i.e., able to maintain a shape for easy handling over short time periods) and at the processing temperature (i.e., malleable enough to be compressed or formed into a desired shape). The processing temperature can be chosen conveniently to be moderately above or below ambient temperature. When the semi-solid material is cured, the reactive plasticizers set up a semi-interpenetrating polymer network within an entangled dead polymer network. In some cases, the reactive plasticizer may react with groups on the dead polymer chain to form completely crosslinked networks.

The term "dead polymer" as used herein and in the appended claims refers to a fully polymerized, generally non-reactive polymer. When certain polymer chemistries are used, the dead polymer may react with a reactive plasticizer, even if the dead polymer does not have unsaturated entities within or attached to the chain. The dead polymer may be linear or branched, homopolymer or copolymer. In the case of a copolymer, the sequence distribution may be random in sequence or blocky. The block copolymers may be tapered, or may have grafted side chains. The architecture of the dead polymer may be branched, multi-chain, comb-shaped or star-shaped. Di-block, tri-block or multi-block structures all fall within the scope of this invention.

The types and relative amounts of reactive plasticizer and dead polymer, the resulting semi-solid material, and methods of making the semi-solid material are disclosed and discussed in International Patent Application Serial No. PCT/US99/22048, the entire disclosure of which is incorporated by reference herein.

In total, the amount and composition of the reactive plasticizer in the resulting formulation are such that the formulation is semi-solid-like and can be effectively handled with no need for a gasket in the mold. That is, the reactive plasticizer is present in concentrations sufficient to allow malleability and moldability at the desired processing temperature and pressure; however, the mixture is non-dripping and not free-flowing over short time periods at the material storage temperature and mold closure temperature, which can be conveniently chosen to be at ambient temperatures, or slightly above or below. The amount of reactive plasticizer is generally about 0.1% to about 100% by weight, preferably from about 1% to about 50%, more preferably from about 3% to about 25%.

The types and relative amounts of reactive plasticizer and dead polymer will dictate the time and temperature-dependent visco-elastic properties of the mixture. The visco-elastic properties of the chosen compositions may be wide and varied. For the practice of the invention as disclosed herein, it is only required that the composition be highly viscous, semi-solid or solid-like for handling and/or insertion into a mold assembly at some temperature, while being semi-solid or liquid-like (i.e., deformable) at the processing temperature to which the mold assembly is heated or cooled after closure. If the mixture consists mostly or wholly of reactive plasticizers, it may need to be cooled or partially cured in order to achieve the semi-solid-like consistency desirable for handling. Likewise, the mold-assembly temperature (the temperature at which the semi-solid composition is inserted into the mold) may desirably be below ambient temperature to prevent dripping or leaking from the mold prior to closure. Once the mold is closed, however, it may be compressed and heated to any pressure and temperature desired to induce conformation of the material to the internal mold cavity, even if such temperatures and pressures effect a free-flowing composition within the mold cavity (i.e., a composition which becomes free-flowing at the molding temperature is not precluded, and may be desirably chosen for the molding of fine-featured parts in which the molding compound must fill in small cavities, channels, and the like).

Alternatively, the dead polymer and reactive plasticizer mixture may be chosen and mixed in such proportions so as to form a composition that is glassy and rigid at ambient temperatures. Such a material will have all the benefits of ease of handling as a semi-solid composition, and will only require that the mold temperature after closure be adjusted to the softening temperature of the mixture in order to allow sufficient deformation of the material so that it may assume the desired shape (optionally in conjunction with applied pressure).

The composition most desirable for the practice of the invention will typically consist of about 3% to about 25% of a reactive plasticizer in a dead polymer. Once combined, said preferable mixture should provide a composition that is semi-solid at room temperature, such that it may be easily handled as a discrete part or object without undue stickiness or deformability. The mixture may be more easily homogenized at an elevated temperature and discharged into discrete parts which roughly approximate the desired shape of the final object, then cooled for handling or storage. When said preferable mixture or parts are placed into a mold and heated slightly above ambient temperature, or otherwise shaped or compressed while simultaneously heated, they will deform into the desired geometry without undue resistance. Such a composition is preferable in that handling and storage may occur at room temperature, while molding or shaping into the desired geometry may occur at temperatures only slightly or moderately removed from ambient.

When used without a dead polymer or with only a small amount of dead polymer, the reactive plasticizer should be a reactive oligomer or a reactive short polymer, having at least one reactive functional group. In this case, the reactive plasticizer should be a longer chain molecule, of from about 1 to about 1000 repeat units, and preferably between about 1 and about 100 repeat units. These reactive plasticizers (or mixture of reactive plasticizers) have a high viscosity, preferably of greater than 1000 centipoise, at the temperature at which the material is to be handled (e.g., inserted into a mold cavity) to exhibit semi-solid behavior. In the case of low molecular weight reactive plasticizers, the mixture may first be slightly polymerized to create the semi-solid consistency required for downstream processing. Alternatively, the mixture may be cooled to create the semi-solid consistency.

Polymerization initiators are added to the mixture to trigger polymerization after molding. Such initiators are well-known in the art. Optionally, other additives may be added, such as mold release agents to facilitate removal of the object from the mold after curing, non-reactive conventional plasticizers or flexibilizers, pigments, dyes, tinting agents, organic or inorganic fibrous or particulate reinforcing or extending fillers, thixotropic agents, indicators, inhibitors or stabilizers (weathering or non-yellowing agents), UV absorbers, surfactants, flow aids, chain transfer agents, anti-reflective agents, scratch-resistant additives, and the like. The initiator and other optional additives may be dissolved in the reactive plasticizer component prior to combining with the dead polymer to facilitate complete dissolution into and uniform mixing with the dead polymer. Alternatively, the initiator and other optional additives may be added to the mixture just prior to polymerization, which may be preferred when thermal initiators are used.

The ingredients in the semi-solid polymerizing mixture can be blended by hand or by mechanical mixing. The ingredients can preferably be warmed slightly to soften the dead polymer component. Any suitable mixing device may be used to mechanically homogenize the mixture, such as blenders, kneaders, extruders, mills, in-line mixers, static mixers, and the like, optionally blended at temperatures above ambient temperature, or optionally blended at pressures above or below atmospheric pressure.

An optional waiting period may be allowed during which the ingredients are not mechanically agitated. The optional waiting period may take place between the time the ingredients are initially metered into a holding container and the time at which they are homogenized mechanically or manually. Alternatively, the ingredients may be metered into a mixing device, said mixing device operated for a sufficient period to dry-blend the ingredients, then an optional waiting period may ensue before further mixing takes place. The waiting period may extend for an hour to one or more days. The waiting period may be chosen empirically and without undue experimentation as the period that gives the most efficient overall mixing process in terms of energy consumption. This may be particularly beneficial when the polymerizable mixture contains a high fraction of the dead polymer ingredient, especially when the dead polymer is glassy or rigid at ambient temperatures. Utilization of a waiting period may also be particularly beneficial when the dead polymer is thermally sensitive and so cannot be processed over an extended time at temperatures above its softening point without undue degradation.

Preferred semi-solid compositions in connection with the present invention are those which are compatible with the optical lens core material(s) chosen to interface with the semi-solid. Such compatibility and processing conditions should be chosen such that no phase separation, crystallization, or clouding occurs at the interface between the semi-solid and the core material. Such factors will primarily be determined by the reactive plasticizers incorporated into the semi-solid, as opposed to the types and amounts of any dead polymer used.

Preferable compositions are ones in which the reactive plasticizers used in the semi-solid material are able to diffuse into the core material. Such behavior facilitates adhesion between the semi-solid and the core by forming a gradient material in which the semi-solid composition changes gradually upon moving across the interface towards the core material. Upon curing of the semi-solid/core sandwich, such gradient materials form an integral monolithic entity; that is, they exhibit integral core-semi-solid compositions with less distinct interfaces, rather than the abrupt compositional changes seen at the interface of conventional coatings, for example.

When using polycarbonate cores, it may be beneficial to use tetrahydrofurfural acrylate or certain urethane acrylates. These show sufficient compatibility with polycarbonate to form strongly adhered layers when a semi-solid containing these reactive plasticizers is combined with a polycarbonate core. Selection of the semi-solid composition will depend on the core material to be used, as well as the desired final properties and configuration of the final composite lens, but such selection may be achieved by those skilled in the art by known methods without undue experimentation.

Other preferable semi-solid compositions may be those that are formulated to possess a similar refractive index to the cores used in accordance with this invention. Matching the refractive index between the semi-solid and core materials to within about 0.05 units of the refractive index will usually minimize any optical aberrations or other interface effects that might exist between the two materials. Alternatively, the semi-solid composition may be formulated to provide the highest or lowest refractive indices possible. High refractive index formulations may be used, for example, to maximize the optical corrective power for a given thickness of lens (where the thickness is determined by, among other things, the difference in radii of curvature between the front and back surfaces). Low refractive index formulations may be desirable to, for example, decrease the amount of light reflected from the front or back surface of a lens. A wide formulation latitude is made possible by the semi-solid compositions disclosed by this invention, and such latitude may be advantageously used to provide materials having a desired refractive index.

The semi-solid materials display low shrinkage upon cure. By "low shrinkage" is meant that the shrinkage of the composition of the invention upon cure will typically be less than about 5%, preferably less than about 2%. This benefit enables molding processes in which the fabricated part shows high replication fidelity of the mold cavity. In other words, because the polymerizable formulation shrinks very little upon cure (typically less than 5%, more preferably less than 2%), the cured part will track the shape of the mold cavity throughout cure. Problems associated with shrinkage such as warpage and premature mold release, which greatly hinder and complicate current state-of-the-art practices, are eliminated. In addition, the finished sandwich structure will have little residual stress. This high replication fidelity is particularly desirable in the casting of optical components that rely on precise, smooth surfaces, such as the ophthalmic lenses of the present invention.

The shrinkage issue is particularly important with respect to the fabrication of a sandwiched composite lens as disclosed herein because the shrinkage associated with conventional curing of pure monomers (e.g., bisallyl carbonates, acrylates, methacrylates, etc. which shrink by up to 15%) can lead to warpage of the core material being used, especially when the resin is only applied to one side of the core. The resultant article will often be bowed or warped in the direction of the cured resin. Also, such shrinkage causes a stress gradient at the interface of the cured resin and the core material. Such stress gradients, aside from producing the warpage mentioned, also lead to adhesion, delamination, and durability problems of such composite lenses.

The semi-solid material of the present invention is distinctly different from monomeric spin-on coatings disclosed in the prior art in that the shrinkage is greatly reduced by the semi-solid compositions, thereby eliminating the warpage, adhesion, delamination, and durability problems encountered previously with pure monomeric resins. The semi-solid material may be formulated to be rubbery, flexible, hard, impact-resistant, scratch-resistant, etc., as desired for the chosen configuration.

By coating or exposing the semi-solid pre-form to additional surface-forming or surface-modifying reactive plasticizers, a gradient material may be formed, as disclosed in International Patent Application Serial No. PCT/US99/21754, published as International Publication No. WO 00/55653, the entire disclosure of which is incorporated herein by reference. In this manner, a rubbery or flexible "layer" or region may be incorporated specifically at the interface between the cured resin and the core material, for example. Such a gradient material may be used, for example, to accommodate and relieve any residual stress between the cured resin material and the core, yielding a composite lens with materials that are strongly bound to each other and not prone to delamination. Likewise, the semi-solid pre-form may be altered such that the final product is rendered hard or scratch-resistant near and at any outer surface by absorbing or otherwise applying or adding a surface-modifying composition containing a scratch-resistant material to such regions or areas of the pre-form where altered properties are desired. In another example, the surface composition may be a dye or pigment solution, which dye or pigment may be, for purposes of illustration, photochromic, fluorescent, UV-absorbing, or visible (color).

The semi-solid polymerizable material may be exposed to the surface-forming/modifying compositions by dipping the semi-solid into a bath of the surface material. Or, the surface materials may be vaporized on, painted on, sprayed on, spun on, printed on, or transferred onto the semi-solid pre-forms by processes known to those skilled in the art of coating and pattern creation/transfer. Alternatively, the surface-forming/modifying composition may be sprayed, painted, printed, patterned, flow-coated, or otherwise applied to one or more mold surfaces that are then contacted with the semi-solid material. Certain of the surface-forming or surface-modifying compositions simply absorb or flow into the loose sponge-like architecture of the uncured or partially cured semi-solid pre-form and are subsequently trapped within the resulting tight, polymerized network when the semi-solid composition is cured completely. In other instances, the surface-forming/modifying composition is itself polymerizable and forms an interpenetrating polymer network structure with the semi-solid pre-form when the two compositions are cured. In either case, the surface treatment is locked in, either chemically, physically, or both, giving a final product where the surface and the interior compositions of the cured resin layer are different and yet the surface and the interior are integral and monolithic.

Surface-forming materials for the purpose of scratch resistance enhancement can be selected from multi-functional crosslinkers that are compatible with the reactive plasticizers of the semi-solid polymerizable composition, so that they will react together to form the monolithic final product. By compatible in this sense is meant that the surface formulation may preferably inter-react with the reactive groups present in the semi-solid composition. Formulations used for imparting scratch resistance will often consist of one or more highly functional (i.e., functionality equal to or greater than 3) reactive species. Polymerization of such highly functional species in the near-surface region of the composite article will produce a tightly crosslinked, scratch-resistant outer layer that is monolithically integrated with the cured resin layer. Examples of such crosslinkers include, but are not limited to, triacrylates and tetraacrylates, and the ethoxylated or propoxylated versions of these multi-functional acrylates. Occluded nano-particles in the surface formulation can also impart exceptional scratch resistance. Those skilled in the art of nano-composites can readily adapt the present invention for use with the nano-composite literature.

Photochromic dyes useful as the surface-forming material are discussed in the following references: "Organic Photochromes", A. V. Elstsov, ed., Consultants Bureau Publishers, New York and London, 1990; "Physics and Chemistry of Photochromic Glasses", A. V. Dotsenko, L. B. Glebor, and V. A. Tsekhomsky, CRC Press, Baton Rouge and New York, 1998; "Photo-Reactive Materials for Ultrahigh Density Optical Memory", M. Irie, ed., Elsevier, Amsterdam and New York, 1994. The dyes may themselves possess reactive groups that chemically lock them into the near-surface region of the object, or the dyes may be entirely inert. In the latter case, the dyes will be held in the surface region of the object by the densely crosslinked network surrounding the dye molecules after polymerization. The process of the present invention allows the choice of dyes for tinting to be greatly expanded over that of the prior art methods. Dyes sensitive to thermal degradation may be utilized as the surface-forming composition, as may dyes that dissolve in organic media. Many commercially available dyes from sources such as Ciba Geigy, Aldrich, BASF, DuPont, etc., are soluble in organic media. Aqueous-phase soluble dyes are also possible candidates for this invention by using surface formulations that are polar or charged, or simply by dissolving the dyes in an inert, polar media (e.g., water, ethanol, ethylene glycol, acetone, etc.) which facilitates their uptake into the article prior to cure.

Low refractive-index monomers and crosslinkers may be used as the surface-forming composition to provide, for example, low reflectivity (for anti-glare applications, for example). Such compositions include vinyl or (meth)

acrylated silicones, as well as perfluorinated or partially fluorinated acrylates and methacrylates and vinyl ethers, such as for example vinyl trifluoroacetate, trifluoroethyl acrylate, pentadecafluorooctyl acrylate, hexafluorobutyl methacrylate, perfluoroethyleneglycol diacrylate, and the like. These perfluorinated compounds may also enhance mold-release properties of the final product, as do silicone acrylates.

Anti-static monomers or inert additives may be used as the surface-forming composition to provide anti-static-charge surfaces in the composite lens. The anti-static surfaces minimize the collection of dust particles, increasing optical transmission and clarity and decreasing the need and frequency of cleanings. Reactive and inert anti-static additives are well known and well enumerated in the literature.

Heterofunctional additives may be used as the surface-forming composition for incorporation into the near-surface region of the semi-solid composite article. These heterfunctional additives may then serve as future reactive sites or as adhesion promoters for subsequent films or coatings. For example, mono-acrylated epoxies, hydroxyacrylates, amino-vinyl ethers, or vinyl anhydrides may be chemically incorporated into the surface region(s) of the composite article by reaction of the vinyl groups. The epoxy, hydroxy, amino, or anhydride groups may then be used to capture, react with, and/or promote adhesion of subsequent films or coatings using chemical reactions other than the vinyl-based polymerization.

In a variation of the process of the invention, a first or front core lens having a multi-vision pocket molded into the front surface (the back surface may be simply spherical, for example) and a second or back core lens having a toroidal back surface and a front surface having nominally the same curvature as the back surface of the front lens are obtained. Next, a semi-solid polymerizable material is placed between the two core lenses, which are then compressed together so that the semi-solid material fills in the gap and forms a layer between the two lenses. In one embodiment of this invention, the semi-solid may be placed in about the center of the two cores so that when the cores are compressed, the semi-solid will flow radially outward towards the core edges. Such a configuration allows the semi-solid to fill in the gap between the cores while reducing or eliminating the entrainment of bubbles, air pockets, or other void defects between the semi-solid and the core(s), between the semi-solid and the mold(s), or within the semi-solid itself. Finally, the entire sandwich is exposed to a source of polymerizing energy to cure the semi-solid material, effectively bonding the two core lenses together. The semi-solid material chosen to form the layer between two such core lens layers may be formulated to be tough, rubbery and/or flexible such that it forms an impact-resistant layer between the two lenses. When polycarbonate is used as the core lenses, such a configuration improves upon the already excellent impact resistance of polycarbonate by providing a cushion or impact-absorbing layer between the front and back polycarbonate cores.

The semi-solid layer may also be formulated to contain liquid crystalline polymers such that a polarizing film is formed and trapped in the semi-solid material (optionally between the two core lenses). Alternatively, semiconducting materials, such as for example semiconducting films or semiconductor chips (e.g., LED's), may be embedded into the semi-solid layer by placing such a film or chip between the semi-solid and the core(s) prior to applying and compressing the semi-solid material. The semiconducting materials may also be placed within the semi-solid material so that the semi-solid material completely encapsulates the semiconducting material prior to applying and compressing the semi-solid material. In either case, the resulting composite lens has light-emitting, light-capturing, or light-altering electronics embedded and encapsulated within. Such a system may further benefit from the semi-solid formulations contemplated in this specification by virtue of the low shrinkage associated with curing these materials.

In yet another variation of the fabrication method of the invention, the semi-solid polymerizable material may be applied to one or more surfaces of an LED, LCD, or other electronic display device. The semi-solid composition may then be compressed, squeezed, or otherwise shaped by a mold coming into contact with the semi-solid material. In one embodiment, the semi-solid is squeezed by the mold such that it flows over and covers the active surface of the display device. The device/semi-solid/mold sandwich is then exposed to a source of polymerizing energy to cure the semi-solid material, after which the mold is removed. The resulting interface between the cured resin and the surrounding ambient has a particular desired geometry to give a surface that directs, focuses, or defocuses incoming or outgoing light. The resultant article is an encapsulated electronic display device in which the encapsulant has molded-in optics on the surface for controlling the reception or emission of light to/from the device.

EXAMPLES

Two example process schemes for preparation of the semi-solid compositions are discussed below. Numerous variants can be envisioned by those skilled in the art of polymerization reaction engineering and polymer processing and molding. Hence, the present invention is not limited by these two example processing embodiments.

Batchwise processing provides precision-casting from pre-forms. A dead polymer, a reactive plasticizer, and an initiator package (optionally including other additives such as anti-oxidants, stabilizers, and the like) are mixed together (optionally with a waiting period during which the ingredients are not mechanically agitated) in a mixer equipped with temperature control and vacuum capabilities, to form a semi-solid polymerizable composition free of voids or air bubbles. The semi-solid composition is discharged from the mixer, and the discharge is cast into slabs (disks, pucks, balls, buttons, sheets, and the like), which serve as pre-forms for the subsequent preparation of the composite optical lenses of the present invention. Alternatively, an extruded strand of the semi-solid composition can be sliced or diced into pre-forms. In a downstream operation, the pre-forms (which may be stored at room temperature or refrigerated temperatures in the interim, or which may even be partially cured to facilitate handling and storage) are retrieved, placed together with at least one optical lens core into a mold, shaped, and cured via exposure to a source of polymerizing energy, into the desired geometry to produce the final composite optical lens article. In a presently preferred embodiment, the pre-forms are sandwiched between mold halves, whereupon the mold is closed, briefly heated to enhance material compliance as necessary, and flood-exposed by UV or heat-cured.

In an alternative, continuous process, the dead polymer, the reactive plasticizer, and the initiator package (optionally including other additives such as anti-oxidants, stabilizers, and the like) are mixed together in an extruder. There is optionally a waiting period prior to the material being introduced into the extruder, during which time the ingredients are in intimate contact with one another, but are not mechanically agitated. Periodically, the extruder discharges a fixed amount of semi-solid reactive plasticizer-dead polymer composition as a warm glob into a temperature-controlled mold cavity containing an optical lens core. The mold, which exhibits a telescopic fit of the front/back mold assembly, is then closed. An optional waiting period may ensue at the still-elevated temperature to anneal any stresses induced by squeezing of the glob. Finally, the captured material is exposed to a source of polymerizing energy.

Material Design Considerations

The semi-solid polymerizable compositions comprise the combination of dead polymers with monomeric or oligomeric reactive diluents. These reactive diluents, when used in small amounts, actually serve the role of plasticizers. Instead of inert plasticizers that simply remain in a plastic to soften the material, the reactive diluents/plasticizers can initially soften the polymer to facilitate the molding process (allowing for lower temperature molding processes compared with the processing of conventional, unplasticized thermoplastic materials); but, upon curing, the polymerized reactive plasticizers lock in the precise shape and morphology of the polymer (and also lock in the reactive plasticizers themselves so that they cannot leak or be leached out of the material over time).

Once polymerized, the reacted plasticizers no longer soften the dead polymer to the same extent as before curing. The hardness of the cured part will be determined by the chemical structure and functionality of the reactive plasticizers and the dead polymers used, their concentration, molecular weight, and the degree of crosslinking and grafting to the dead polymer chains. Additionally, chain-terminating agents can be added to the formulation prior to polymerization in order to limit the molecular weight and degree of crosslinking of the polymer formed by reacting the plasticizers, thus adding a measure of control in altering the final mechanical properties of the cured parts. At the same time polymerization results in no significant shrinkage (due to the overall low concentration of the reactive plasticizer or the low population of reactive entities), so the finished objects remain dimensionally stable, yielding high fidelity replication of the mold cavity. Precise geometric replication of the mold cavity is further preserved due to the relatively low molding temperatures and reduced exotherm from polymerization.

Subsequent discussions concerning the basic material design considerations are divided into two categories based on the type of dead polymer utilized in the process. One category begins with standard thermoplastics as the dead polymer. These include, but are not limited to, polystyrene, polymethylmethacrylate, poly(acrylonitrile-butadiene-styrene), polyvinyl chloride, polycarbonate, polysulfone, polyvinylpyrrolidone, polycaprolactone, and polyetherimide, for example. The thermoplastics may optionally have small amounts of reactive entities attached (copolymerized, grafted, or otherwise incorporated) to the polymer backbone to promote crosslinking upon cure. They may be amorphous or crystalline. They may be classified as engineering thermoplastics, or they may be biodegradable. These examples are not meant to limit the scope of compositions possible during the practice of the current invention, but merely to illustrate the broad selection of thermoplastic chemistries permitted under the present disclosure. Reactive plasticizers may be mixed with a thermoplastic polymer such as those listed above to give a semi-solid-like composition that can be easily molded into dimensionally precise objects. Upon curing, the dimensional stability of the object is locked in to give exact three-dimensional shapes or precise surface features. Thermoplastic polymers may be chosen in order to give optical clarity, high index of refraction, low birefringence, exceptional impact resistance, good thermal stability, high oxygen permeability, UV transparency or blocking, low cost, or a combination of these properties in the finished, molded object.

The other category utilizes "thermoplastic elastomers" as the dead polymer. An exemplary thermoplastic elastomer is a tri-block copolymer of the general structure "A-B-A", where A is a thermoplastic rigid polymer (i.e., having a glass transition temperature above ambient) and B is an elastomeric (rubbery) polymer (glass transition temperature below ambient). In the pure state, ABA forms a microphase-separated morphology. This morphology consists of rigid glassy polymer regions (A) connected and surrounded by rubbery chains (B), or occlusions of the rubbery phase (B) surrounded by a glassy (A) continuous phase, depending on the relative amounts of (A) and (B) in the polymer. Under certain compositional and processing conditions, the morphology is such that the relevant domain size is smaller than the wavelength of visible light. Hence, parts made of such ABA copolymers can be transparent or at worst translucent. Thermoplastic elastomers, without vulcanization, have rubber-like properties similar to those of conventional rubber vulcanizates, but flow as thermoplastics at temperatures above the glass transition point of the glassy polymer region. Melt behavior with respect to shear and elongation is similar to that of conventional thermoplastics. Commercially important thermoplastic elastomers are exemplified by SBS, SIS, SEBS, where S is polystyrene and B is polybutadiene, I is polyisoprene, and EB is ethylenebutylene copolymer. Many other di-block or tri-block candidates are known, such as poly(aromatic amide)-siloxane, polyimide-siloxane, and polyurethanes. SBS and hydrogenated SBS (i.e., SEBS) are well-known products from Shell Chemicals (Kraton®). DuPont's Lycra® is also a block copolymer.

When thermoplastic elastomers are chosen as the starting dead polymer for formulation, exceptionally impact-resistant parts may be manufactured by mixing with reactive plasticizers. The thermoplastic elastomers, by themselves, are not chemically crosslinked and require relatively high-temperature processing steps for molding which, upon cooling, leads to dimensionally unstable, shrunken or warped parts. The reactive plasticizers, if cured by themselves, may be chosen to form a relatively glassy, rigid network, or may be chosen to form a relatively soft, rubbery network, but with relatively high shrinkage. When thermoplastic elastomers and reactive plasticizers are blended together, they form flexible networks with superior shock-absorbing and impact-resistant properties. By "impact-resistant" is meant resistance to fracture or shattering upon being struck by an incident object. Depending on the nature of the dead polymer and reactive plasticizers used in the formulation, the final cured material may be more stiff or more stretchy than the starting dead polymer. Composite articles exhibiting exceptional toughness may be fabricated by using a thermoplastic elastomer which itself contains polymerizable groups along the polymer chain, such as SBS tri-block copolymers, for example.

Furthermore, when compatible systems are identified, transparent objects can be cast. "Compatibility" refers to the thermodynamic state where the dead polymer is solvated by the reactive plasticizers. Hence, molecular segments with structural similarity would promote mutual dissolution. Aromatic moieties on the polymer generally dissolve in aromatic plasticizers, and vice versa. Hydrophilicity and hydrophobicity are additional considerations in choosing the reactive plasticizers to mix with a given dead polymer. Even when only partial compatibility is observed at room temperature, the mixture often becomes uniform at a slightly increased temperature; i.e., many systems become clear at slightly elevated temperatures. Such temperatures may be slightly above ambient temperatures or may extend up to the vicinity of 100° C. In such cases, the reactive components can be quickly cured at the elevated temperature to "lock-in" the compatible morphology before system cool-down. Hence, both material and processing approaches can be exploited to produce optically clear parts. Optically clear and dimensionally exact parts have a wide range of potential applications. Both polycarbonate and thermoplastic elastomers can be employed to create useful formulations by mixing with suitable reactive plasticizer packages. With the process innovation described herewith, powerful new material systems can be developed.

A preferred formulation for developing optically clear and high impact-resistant materials uses styrene-rich SBS triblock copolymers that contain up to about 75% styrene. These SBS copolymers are commercially available from Shell Chemicals (Kraton®), Phillips Chemical Company (K-Resin®), BASF (Styrolux®), Fina Chemicals (Finaclear®), and Asahi Chemical (Asaflex®). In addition to high impact resistance and good optical clarity, such styrene-rich copolymers yield materials systems which preferably exhibit other desirable properties such as high refractive index (that is, the index of refraction is greater than 1.499) and low density. When the mixture refractive index is an especially important consideration, high refractive index polymers may be used as one or more of the dead-polymer components. Examples of such polymers include poly(pentabromophenyl (meth)acrylate), polyvinyl carbazole, polyvinyl naphthalene, poly vinyl biphenyl, polynaphthyl (meth)acrylate, polyvinyl thiophene, polysulfone, polyphenylene sulfides, urea-, phenol-, or naphthyl-formaldehyde resins, polyvinyl phenol, chlroinated or brominated polystyrenes, poly(phenyl α- or β-bromoacrylate, polyvinylidene chloride or bromide, etc. In general, increasing the aromatic content or halogen content (especially bromine) are effective means well-known in the art for increasing the refractive index of a material. These properties are especially preferred for ophthalmic lenses as it enables the production of ultra thin, light-weight eyeglass lenses which are desirable for low-profile appearances and comfort of the wearer.

Alternatively, elastomers, thermosets (e.g., epoxies, melamines, acrylated epoxies, acrylated urethanes, etc., in their uncured state), and other non-thermoplastic polymeric compositions may be desirably utilized during the practice of this invention.

Mixtures of such materials may also be beneficially used to create dimensionally stable parts with desirable properties. For example, impact modifiers may be blended into various thermoplastics or thermoplastic elastomers to improve the impact strength of such material systems. In such cases, the presence of the reactive plasticizers will facilitate blending by lowering the softening temperature of the polymers to be blended. This is especially beneficial when a temperature-sensitive material is being blended with a high-$T_g$ polymer. When optically clear materials are desired, the mixture components may be chosen to have the same refractive index (iso-refractive) such that light scattering is reduced. When iso-refractive components are not available, the reactive plasticizers may also help reduce the domain size between two immiscible polymers to below the wavelength of light, thus producing an optically clear polymer mixture which would have otherwise been opaque.

The reactive diluents (plasticizers) can be used singly or, alternatively, mixtures can be used to facilitate dissolution of a given dead polymer. The reactive functional group can be acrylate, methacrylate, acrylic anhydride, acrylamide, vinyl, vinyl ether, vinyl ester, vinyl halide, vinyl silane, vinyl siloxane, (meth)acrylated silicones, vinyl heterocycles, diene, allyl and the like. Other less known but polymerizable functional groups can be investigated, such as epoxies (with hardeners) and urethanes (reaction between isocyanates and alcohols). In principle, any monomers may be used as reactive plasticizers in accordance with the present invention, although preference is given to those which exist as liquids at ambient temperatures or slightly above, and which polymerize readily with the application of a source of polymerizing energy such as light or heat in the presence of a suitable initiator.

Reactive monomers, oligomers, and crosslinkers that contain acrylate or methacrylate functional groups are well known and commercially available from Sartomer, Radcure and Henkel. Similarly, vinyl ethers are commercially available from Allied Signal. Radcure also supplies UV curable cycloaliphatic epoxy resins. Photo-initiators such as the Irgacure and Darocur series are well-known and commercially available from Ciba Geigy, as is the Esacure series from Sartomer. Thermal initiators such as azobisisobutyronitrile (AIBN), benzoyl peroxide, dicumyl peroxide, t-butyl hydroperoxide, and potassium persulfate are also well known and are available from chemical suppliers such as Aldrich. Vinyl, diene, and allyl compounds are available from a large number of chemical suppliers, as is benzophenone. For a reference on initiators, see, for example, Polymer Handbook, J. Brandrup, E. H. Immergut, eds., $3^{rd}$ Ed., Wiley, N.Y., 1989. Below we will use acrylates (and in a few cases, methacrylates) to illustrate the flexibility of our formulation approach. Similar structures with other reactive groups based on either small or large molecule architectures (such as acrylamides, vinyl ethers, vinyls, dienes, and the like) can be used in conjunction with the disclosed casting process.

The compatibility of dead polymer-reactive plasticizer mixtures is demonstrated by checking the optical transparency of the resulting material at room temperature or slightly above, as illustrated by Example 1 below. To demonstrate the great diversity of reactive plasticizers that can be used to achieve such compatibility, we will name only a few from a list of hundreds to thousands of commercially available compounds. For example, mono-functional entities include, but are not limited to: isodecyl acrylate, hexadecyl acrylate, stearyl acrylate, isobornyl acrylate, vinyl benzoate, tetrahydrofurfuryl acrylate (or methacrylate), caprolactone acrylate, cyclohexyl acrylate, methyl methacrylate, ethyl acrylate, propyl acrylate, and butyl acrylate, etc. Bi-functional entities include, but are not limited to: polyethyleneglycol diacrylate, polypropyleneglycol diacrylate, hexanediol diacrylate, Photomer 4200 (from Henkel), polybutadiene diacrylate (or dimethacrylate), Ebecryl 8402 (from Radcure), bisphenol A diacrylate, ethoxylated (or propoxylated) bisphenol A diacrylate. Tri-functional and multi-functional entities include, but are not limited to: trimethylolpropane triacrylate (and its ethoxylated or propoxylated derivatives), pentaerythritol tetraacrylate (and its ethoxylated or propoxylated derivatives), Photomer 6173 (a proprietary acrylated oligomer of multi functionality, from Henkel), and a whole host of aliphatic and aromatic acrylated oligomers from Sartomer (the SR series), Radcure (the Ebecryl series), and Henkel (the Photomer series).

When high refractive index materials are desired, the reactive plasticizers may be chosen accordingly to have high refractive indices. Examples of such reactive plasticizers, in addition to those mentioned above, include brominated or chlorinated phenyl (meth)acrylates (e.g., pentabromo methacrylate, tribromo acrylate, etc.), brominated or chlorinated naphthyl or biphenyl (meth)acrylates, brominated or chlorinated styrenes, tribromoneopentyl (meth)acrylate, vinyl naphthylene, vinyl biphenyl, vinyl phenol, vinyl carbazole, vinyl bromide or chloride, vinylidene bromide or chloride, bromoethyl (meth)acrylate, bromophenyl isocyanate, etc.

The following examples are provided to illustrate the practice of the present invention, and are intended neither to define nor to limit the scope of the invention in any manner.

The Examples 1 to 8 below are designed to discover pairs of materials that exhibit thermodynamic compatibility prior to polymerization. Examples 9 to 11 show systems that remain optically clear upon photocuring, and further illustrate material systems exhibiting high refractive indices. Tertiary, quaternary, and multi-component mixtures can be formulated based on knowledge gleaned from binary experiments. Generally, diluents that are small molecules have a higher degree of shrinkage. But, they are also typically better plasticizers. On the contrary, oligomeric plasticizers shrink less, but they also show less salvation power and less viscosity reduction. Hence, mixtures of reactive plasticizers can be prepared to give optimized compatibility, processing, and shrinkage properties. Examples 12 to 15 provide exemplary composite lenses which may be prepared according to this invention.

Example 1

Experimental Protocol

Dead polymers are added to a vial, pre-filled with a small quantity of the intended reactive plasticizer. Gentle heating is applied while stirring homogenizes the mixture. The resulting semi-solid-like mass is observed visually and optical transparency at various temperatures is recorded. Complete clarity is indicative of component miscibility. A faint haze suggests partial miscibility, and opacity equates to incompatibility (light scattering as a result of phase separation). Many pairs of dead polymer-reactive plasticizers can thus be investigated.

Examples 2 to 8 report several findings of system compatibility and partial compatibility, following this procedure.

Example 2

Kraton-Based Systems

The following polymers are studied using the protocol described in Example 1. The accompanying table summarizes the polymer characteristics.

TABLE 1

| Krayton type | Composition (%) | Description |
|---|---|---|
| G 1652 | SEBS (S: 29/EB: 71) | linear, low molecular weight |
| G 1650 | SEBS (S: 29/EB: 71) | linear, medium Mw |
| G 1657 | SEBS (S: 13/EB: 87) | linear |
| D 1102 | SBS (S: 28/B: 72) | linear, low Mw |
| D 4141 | SBS (S: 31/B: 69) | linear |
| D 4240p | (SB)$_n$ (S: 44/B: 56) | branched |
| D 1116 | (SB)$_n$ (S: 21/B: 79) | branched |
| D 1107 | SIS (S: 14/I: 86) | linear |

TABLE 1-continued

| Krayton type | Composition (%) | Description |
|---|---|---|

S = styrene,
EB = ethylene butylene,
B = butadiene,
I = isoprene

Hexanediol diacrylate solvates all Kraton samples well except for G 1650, which shows partial miscibility. Photomer 4200 solvates D1102, D1107, D4141, D4240p, and G1657 at elevated temperatures. Photomer 4200 (an oligomeric diacrylate) solvates G 1652 partially. Polybutadiene dimethacrylate (Sartomer CN301) solvates D1116, D1102, and D4141 partially at elevated temperatures. Ebecryl 8402 solvates G 1657. Isodecyl acrylate is compatible with all of the above Kratons. Hexadecyl acrylate, lauryl acrylate, and stearyl acrylate solvate Kraton at elevated temperatures.

Other monomers that solvate Kraton include butyl acrylate, isooctyl acrylate, isobornyl acrylate, benzyl acrylate, tetrahydrofurfuryl acrylate, and vinyl benzoate. In general, aliphatic acrylates solvate rubbery Kraton well. Ethoxylated bisphenol A diacrylate (average molecular weight of 424) solvates Kraton D4240p, D1107, D4141, and D1102 only slightly.

Example 3

Styrene-Rich-SBS Systems

Kraton D1401P is a linear styrene-rich SBS tri-block copolymer. Reactive plasticizers that solvate Kraton D1401P include: vinyl benzoate; tetrahydrofurfuryl acrylate; benzyl acrylate; isobornyl acrylate; butyl acrylate; octyl acrylate; isodecyl acrylate; butanediol diacrylate; hexanediol diacrylate; and ethoxylated bisphenol A diacrylate.

To obtain thermodynamically compatible systems containing styrene-rich SBS tri-block copolymers, Kraton D1401P can be replaced by other SBS copolymers such as those that are commercially available from Phillips Chemical Company (K-Resin), BASF (Styrolux), Fina Chemicals (Finaclear), and Asahi Chemical (Asaflex).

Example 4

PMMA-Based Systems

This study is conducted with a polymethyl methacrylate (PMMA) sample of molecular weight 25,000. Many reactive plasticizers have been found compatible with PMMA. These are: Photomer 4200; Photomer 6173; many alkoxylated multifunctional acrylate esters, such as propoxylated glycerol triacrylate; urethane acrylates, such as Ebecryl 8402 (aliphatic) and Ebecryl 4827, 4849 and 6700 (aromatic); tetrahydrofurfuryl acrylate; benzyl acrylate; butyl acrylate; butanediol diacrylate; hexanediol diacrylate; octyldecyl acrylate; isobornyl acrylate; and ethoxylated bisphenol A diacrylate.

Example 5

Polystyrene-Based Systems

Acrylated plasticizers that solvate polystyrene include Photomer 4200, tetrahydrofurfuryl acrylate, isodecyl acrylate. Bisphenol A diacrylate, hexadecyl acrylate, and stearyl acrylate exhibit compatibility at elevated temperatures (approximately 100° C. for example).

Example 6

Polycarbonate-Based Systems

Bisphenol A diacrylate, alkoxylated bisphenol A diacrylate, cycloaliphatic epoxy resin, N-vinyl-2-pyrrolidinone,-and tetrahydrofurfuryl acrylate, among others, have been found useful for the solvation of polycarbonate at elevated temperature. Several aromatic urethane acrylates can be mixed with the above compounds to aid the compatibility of the ingredients.

Example 7

ARTON-Based Systems

Reactive plasticizers that solvate ARTON FX4727T1 (JSR Corporation) are: benzyl acrylate; isobornyl acrylate; isobornyl methacrylate; butyl acrylate; octyl acrylate; isooctyl acrylate; isodecyl acrylate; lauryl acrylate; behenyl acrylate. Aliphatic acrylates solvate ARTON very well.

Example 8

ZEONEX-Based Systems

Octyldecyl acrylate, butyl acrylate, and isooctyl acrylate solvate Zeonex 480R (Nippon Zeon Co., Ltd). Isobornyl acrylate solvates Zeonex 480R and E48R, and Zeonor 1420R, 1020R and 1600R. Lauryl acrylate and behenyl acrylate solvate ZEONEX 480R and E48R at elevated temperature.

Example 9

Transparent Photo-cured Systems

Mixtures containing the dead polymer, reactive plasticizer, and photoinitiator were mixed by the protocol described in Example 1. The amount of reactive plasticizer was typically 3% to 25% and the photoinitiator was 1% to 5% by weight. Example photoinitiators include Esacure KT046 from Sartomer and Irgacure 184 from Ciba Geigy.

The resulting semi-solid composition was slightly heated (less than or equal to about 100° C.), pressed between flat glass plates, and flood-exposed by UV light. Rapid polymerization was observed that led to a clear and solid-like material.

The examples of transparent photo-cured systems included: Kraton D1401 P-based systems reported by Example 3; PMMA-based systems reported by Example 4; ARTON-based systems reported by Example 7. Kraton D1401P-based systems also showed exceptional impact-resistance.

Example 10

Transparent Photo-cured Systems Having a High Refractive Index

A mixture containing a dead polymer, reactive plasticizer, and photoinitiator was mixed by the protocol described in Example 1, and was processed further as described in Example 9. The dead polymer was Kraton D1401 P and the reactive plasticizer was benzyl acrylate, mixed at a ratio by weight of 88/12. Irgacure 184 was added to the mixture at 2 wt % based on the overall weight of the system. Upon UV cure, a flat sample having a thickness of 2.4 millimeters was produced, which showed 88% light transmittance at a wavelength of 700 nm. The refractive index of the cured sample was 1.578 at the sodium D line at room temperature.

Example 11

Transparent Systems Utilizing a Waiting Period

Kraton D1401P and isooctyl acrylate were added to a glass vial in the weight ratio 93/7. The capped vial was allowed to sit overnight. After 24 hours, the mixture was a clear, semi-solid mass. Irgacure 184 was added to the mixture at 2 wt % (based on the overall weight of the system), and was dissolved into the system while slightly heating and mixing manually. The resulting semi-solid mass was processed further as described in Example 9. Upon UV cure, a flat sample having a thickness of 2.3 millimeters was produced, which showed 90% light transmittance at a wavelength of 700 nm. The refractive index of the cured sample was 1.574 at the sodium D line at room temperature.

Example 12

A Composite Lens Formed from a Polycarbonate Front Core and a Back Semi-Solid Layer A semi-solid composition is formed by mixing Kraton D1401P, benzyl acrylate, and a UV initiator, as described in Example 10. A polycarbonate core is obtained which has a plano, base 4.5 curve on the front and back surface, and a +2 bifocal pocket molded into the front surface. A back lens mold is also obtained having a base curve of 6.5 (for −2 diopter correction relative to the front surface of the polycarbonate core), and an imposed +½ diopter cylinder, to give a toroidal mold surface. The semi-solid mass is placed in the center of the back surface of the polycarbonate core, and the lens mold, which is rotated appropriately to align the toroidal surface with the bifocal pocket in the polycarbonate core to give a cylinder angle of zero degrees, is used to compress the semi-solid material so that it fills in the cavity between the mold surface and the polycarbonate core. Upon compressing, the semi-solid flows radially from the center outwards towards the mold/core edges. Ultraviolet light is then projected through the lens mold and the polycarbonate core to cure the semi-solid material. The polycarbonate core/cured resin sandwich is then separated from the mold, yielding a composite lens consisting of a front polycarbonate core and a back layer of cured resin. The lens has a bifocal pocket built into the front surface and an aligned toroidal back surface for astigmatic correction. Note: the cylinder alignment can be easily adjusted to form a lens with other desired degrees of rotation by simply rotating the back mold relative to the front core prior to compression of the semi-solid material.

Example 13

A Composite Lens Formed from a Polycarbonate Back Core and a Front Semi-Solid Layer A semi-solid composition is formed by mixing Kraton D1401P, benzyl acrylate, and a UV initiator, as described in Example 10. A front lens mold is obtained which has a base 4.5 curve with a +2 bifocal pocket. A back polycarbonate core is also obtained having a base curve of 6.5 on the front and back surface (for −2 diopter correction relative to the surface of the lens mold), and an imposed ½ diopter cylinder to give a toroidal back surface. The semi-solid mass is placed in the center of the lens mold, and the polycarbonate core, rotated appropriately to align the toroidal surface with the bifocal pocket on the lens mold surface to give a cylinder angle of zero degrees, is used to compress the semi-solid so that it fills in the cavity between the mold surface and the polycarbonate core. Upon compressing, the semi-solid material flows radially from the center outwards towards the mold/core edges. Ultraviolet light is then projected through the lens mold and the polycarbonate core to cure the semi-solid material. The polycarbonate core/cured resin sandwich is then separated from the mold, yielding a composite lens consisting of a back polycarbonate core and a front layer of cured resin. The lens has a bifocal pocket molded into the front surface and an aligned toroidal back surface for astigmatic correction. Note: the cylinder alignment can be easily adjusted to form a lens with other desired degrees of rotation by simply rotating the polycarbonate core relative to the front mold prior to semi-solid compression.

Example 14

A Composite Lens Formed from a Center Polycarbonate Core and Two Front and Back Semi-Solid Layers A semi-solid composition is formed by mixing Kraton D 1401P, benzyl acrylate, and a UV initiator, as described in Example 10. A front lens mold is obtained which has a base 4.5 curve with a +2 bifocal pocket. A back lens mold is also obtained having a base curve of 6.5 (for −2 diopter correction relative to the surface of the front lens mold), and an imposed +½ diopter cylinder, to give a toroidal mold surface. A center polycarbonate core is obtained having a base curve of 4.5 on the front and back surfaces (i.e., a piano lens). The front semi-solid mass is placed in the center of the front lens mold, and the polycarbonate core is placed in contact with the front semi-solid material. The back semi-solid mass is then placed in the center of the polycarbonate core, and the back lens mold, rotated appropriately to align the toroidal surface with the bifocal pocket on the front lens mold surface to give a cylinder angle of zero degrees, is used to compress the semi-solids so that they fill in the cavities between the mold surfaces and the polycarbonate core. Upon compressing the semi-solid material, it flows radially from the center outwards towards the mold/core edges. Ultraviolet light is then projected through the front and back lens molds to cure the semi-solid material. The polycarbonate core/cured resin sandwich is then separated from the molds, yielding a composite lens consisting of front and back molded layers of cured resin and a center polycarbonate core in between them. The lens has a bifocal pocket molded into the front surface and an aligned toroidal back surface for astigmatic correction. Note: the cylinder alignment can be easily adjusted to form a lens with other desired degrees of rotation by simply rotating the back lens mold relative to the front mold prior to compression of the semi-solid material.

Example 15

A Composite Lens Formed from Two Polycarbonate Cores and a Center Semi-Solid Layer A semi-solid composition is formed by mixing Kraton D4240P and tetrahydrofurfural acrylate in a ratio of 4:1. A UV initiator, Irgacure 184, is added at 2 wt %. A first or front polycarbonate core is obtained which has a piano, base 4.5 curve on the front and back surfaces, and a +2 bifocal pocket molded into the front surface. A second or back polycarbonate core is also obtained having a base curve of 6.5 on the front and back surfaces (for −2 diopter correction relative to the surface of the lens mold), and an imposed ½ diopter cylinder to give a toroidal back surface. The polycarbonate cores are rotated so as to align the toroidal back surface with the bifocal pocket to give a cylinder angle of zero degrees. The semi-solid mass is placed near the center of the front polycarbonate core, and the two cores are then compressed together so that the semi-solid fills in the cavity between them by flowing from the center outward towards the edges of the cores. Ultraviolet light is then projected through the front and back cores to cure the semi-solid material. The resulting composite lens consists of front and back polycarbonate cores, with the cured resin in between them bonding the two cores together. The lens has a bifocal pocket built into the front surface and an aligned toroidal back surface for astigmatic correction. Note: the cylinder alignment can be easily adjusted to form a lens with other desired degrees of rotation by simply rotating the back core relative to the front core prior to compression of the semi-solid material. The resulting lens is also extremely impact resistant.

What is claimed is:

1. A method for preparing a composite lens, comprising the steps of:
   a) obtaining a core;
   b) placing a semi-solid polymerizable material in contact with at least one of the front or back surface of the core, the semi-solid polymerizable material comprising a reactive plasticizer, an initiator and a fully polymerized, generally non-reactive polymer, to give a semi-solid/core sandwich;
   c) compressing the semi-solid/core sandwich between two mold halves while optionally heating the semi-solid polymerizable material, where the portion of the mold contacting the semi-solid polymerizable material has a desired surface geometry; and
   d) exposing the semi-solid/core sandwich to a source of polymerizing energy to cure the semi-solid material and to bond the core and the semi-solid material together; to give a composite lens comprising a core portion and at least one layer of a cured resin bonded to the core portion, wherein the cured resin comprises a semi-interpenetrating crosslinked polymer network of reactive plasticizer within an entangled fully polymerized, generally non-reactive polymer.

2. A method according to claim 1 wherein, in step b), the semi-solid polymerizable material is placed in contact with the core at about the center of the core, such that compressing the semi-solid/core sandwich while optionally heating causes the semi-solid polymerizable material to flow radially outward.

3. A method according to claim 1 which further comprises the step of exposing the semi-solid polymerizable material to a surface-modifying material before exposing to the source of polymerizing energy.

4. A method according to claim 3 wherein the surface-modifying material comprises a scratch-resistant precursor formulation.

5. A method according to claim 1 which further comprises the step of providing a waiting period at a predetermined temperature after the semi-solid/core sandwich is compressed between the mold halves and before exposing to the source of polymerizing energy.

6. A method according to claim 1 which further comprises the step of placing a semiconducting material within or between the semi-solid material and the core prior to applying and compressing the semi-solid material to the core.

7. A method according to claim 1 wherein the semi-solid material further comprises liquid crystalline polymers.

8. A method for preparing a composite lens, comprising the steps of:

a) obtaining a front core lens and a back core lens;
b) placing a semi-solid polymerizable material between the front and back core lenses, the semi-solid polymerizable material comprising a reactive plasticizer, an initiator and a fully polymerized, generally non-reactive polymer, to form a sandwich of the core lenses having a layer of the semi-solid polymerizable material between the lenses;
c) compressing the front and back core lenses of the sandwich together, while optionally heating the semi-solid polymerizable material; and
d) exposing the sandwich to a source of polymerizing energy to cure the semi-solid material and to bond the two core lenses and the semi-solid material together; to give a composite lens comprising a front core portion and a back core portion and a layer of a cured resin bonded between the two core portions, wherein the cured resin comprises a semi-interpenetrating crosslinked polymer network of reactive plasticizer within an entangled fully polymerized, generally non-reactive polymer.

9. A method according to claim 8 wherein, in step b) the semi-solid polymerizable material is placed in contact with the core lenses at about the center of the core lenses, such that compressing the sandwich while optionally heating causes the semi-solid polymerizable material to flow radially outward.

10. A method according to claim 1 wherein the core is selected from the group consisting of optical quality glasses, photochromic glasses, bisallyl carbonates, halogenated aromatic polycarbonates, non-halogenated aromatic polycarbonates, polyethylene terephthalates, polybutylene terephthalates, polystyrenes, polymethyl methacrylates, acrylonitrile-butadiene-styrene copolymers, polystyrene-co-butadiene copolymers, polystyrene-co-isoprene copolymers, polycyclohexylethylene-co-butadiene copolymers, amorphous polyolefins, and polyurethanes.

11. A method according to claim 1 wherein the core is a polycarbonate of bisphenol A.

12. A method according to claim 1 wherein the generally non-reactive polymer is selected from the group consisting of thermoplastics, thermosets, theremoplastic elastomers, and high performance engineering thermoplastics.

13. A method according to claim 1 wherein the core and the semi-solid material form an integral monolithic entity upon curing.

14. A method according to claim 3 wherein the composition of the surface-modifying material is distinct from the composition of the semi-solid material and wherein the surface-modifying material and the semi-solid material form an integral, monolithic entity upon curing.

15. A method according to claim 8 which further comprises the step of providing a waiting period at a predetermined temperature after the sandwich is compressed together and before exposing to the source of polymerizing energy.

16. A method according to claim 8 which further comprises the step of placing a semiconducting material within or between the semi-solid material and at least one of the core lenses prior to applying and compressing the semi-solid material to the cores.

17. A method according to claim 8 wherein the semi-solid material further comprises liquid crystalline polymers.

18. A method according to claim 8 wherein the core lenses are a polycarbonate of bisphenol A.

19. A method according to claim 8 wherein the core lenses form an integral monolithic entity with the semi-solid material upon curing.

20. A method according to claim 1 wherein the semi-solid polymerizable material further comprises a photochromic dye.

21. A method according to claim 20 wherein the core is a polycarbonate.

22. A method according to claim 1 wherein the core is a polycarbonate.

23. A method according to claim 8 wherein the semi-solid polymerizable material further comprises a photochromic dye.

24. A method according to claim 23 wherein the core lenses are a polycarbonate.

25. A method according to claim 8 wherein the core lenses are a polycarbonate.

* * * * *